(12) United States Patent
Veenstra et al.

(10) Patent No.: US 6,781,475 B2
(45) Date of Patent: Aug. 24, 2004

(54) TRANSMISSION LINES ARRANGEMENT

(76) Inventors: Hugo Veenstra, Prof. Holstlaan 6, 5656 AA Eindhoven (NL); Edwin Van Der Heijden, Prof. Holstlaan 6, 5656 AA Eindhoven (NL); Mihai Adrian Tiberiu Sanduleanu, Prof. Holstlaan 6, 5656 AA Eindhoven (NL)

( * ) Notice: Subject to any disclaimer, the term of this patent is extended or adjusted under 35 U.S.C. 154(b) by 15 days.

(21) Appl. No.: 10/198,494

(22) Filed: Jul. 18, 2002

(65) Prior Publication Data
US 2003/0030509 A1 Feb. 13, 2003

(30) Foreign Application Priority Data

Jul. 23, 2001 (EP) .............................................. 01202819

(51) Int. Cl.$^7$ ................................................ H01P 1/10
(52) U.S. Cl. ........................................ 333/103; 326/41
(58) Field of Search ................................ 333/103, 104; 326/37–41

(56) References Cited

U.S. PATENT DOCUMENTS

| 4,731,594 A | | 3/1988 | Kumar ........................ 333/103 |
| 5,504,745 A | * | 4/1996 | Petz et al. .................... 370/480 |
| 6,265,953 B1 | * | 7/2001 | Romano ...................... 333/101 |
| 6,268,743 B1 | * | 7/2001 | Kaptanoglu .................. 326/40 |

FOREIGN PATENT DOCUMENTS

EP        00331494 A2    5/1981    ........... H04B/7/185

OTHER PUBLICATIONS

XilinX, The Programmable Logic Data Book, XilinX, 1996.*

* cited by examiner

Primary Examiner—Don Le
(74) Attorney, Agent, or Firm—Aaron Waxler

(57) ABSTRACT

A transmission lines arrangement comprising a first plurality of transmission lines each transmission line having an effective characteristic impedance. The arrangement further comprises a second plurality of transmission lines, said first plurality of transmission lines being coupled to a plurality of switching elements. The plurality of switching elements are conceived to redirect an input signal from one transmission line of the first plurality of transmission lines to at least one transmission line of the second plurality of transmission lines. The arrangement is characterized in that each of the switching elements of the plurality of switching elements have a relatively high input impedance in comparison with the effective characteristic impedance and a relatively high output impedance in comparison with the effective characteristic impedance. Furthermore, each transmission line of the first plurality of transmission lines is further coupled to an impedance that is substantially equal to the effective characteristic impedance of said transmission line.

6 Claims, 2 Drawing Sheets

TRANSMISSION LINES ARRANGEMENT

Figure 1:
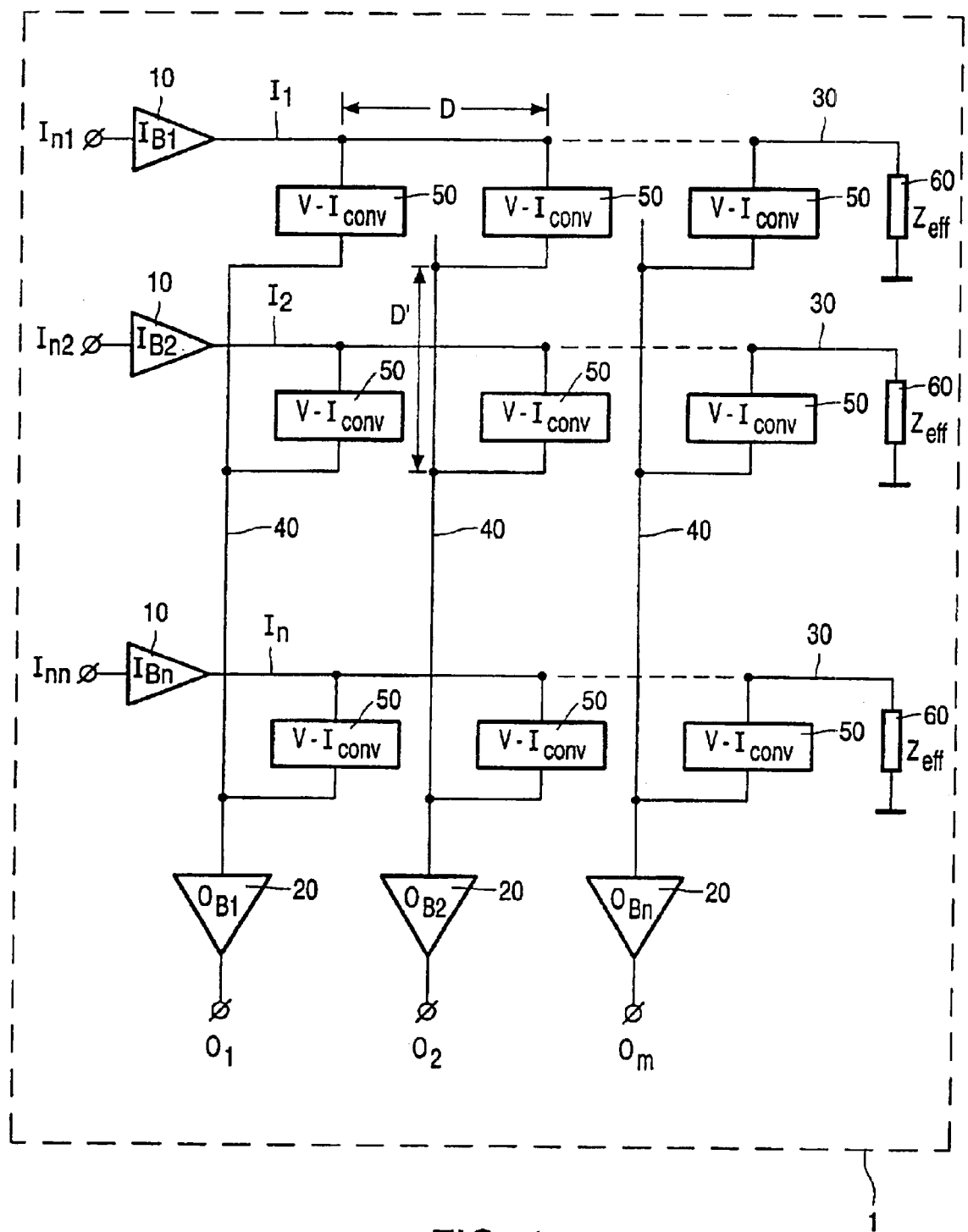

The invention relates to a transmission lines arrangement comprising a first plurality of transmission lines, each transmission line having an effective characteristic impedance and comprising a second plurality of transmission lines, said first plurality of transmission lines being coupled to a plurality of switching elements, the plurality of switching elements redirecting an input signal from one transmission line of the first plurality of transmission lines to at least one transmission line of the second plurality of transmission lines.

In modern communication circuits operating at GigaHerz (GHz) frequencies e.g. crosspoint matrix switching circuits, most often a circuit connection between portions of the circuits could be considered to behave like a transmission line having a characteristic impedance. As examples of transmission lines could be cited telephone lines, wave guides, connections between computers.

In such a crosspoint matrix switching circuit an input signal could be redirected via switching elements to at least one output, e.g. in a broadcast mode the input signal is redirected to all the outputs simultaneously. Usually such a crosspoint matrix circuit may be symbolically represented as a bi-dimensional array comprising n horizontal transmission lines i.e. the first plurality of transmission lines and m vertical transmission lines i.e. the second plurality of transmission lines. At any crosspoint between any horizontal transmission line and any vertical transmission line there is a switch element for redirecting a signal coming e.g. on a horizontal transmission line to at least one vertical transmission line. Accordingly the switches could be considered to be distributed on a horizontal line and on a vertical line. A switch element is an electronic device having an input and an output and being controlled by a binary signal. When the binary signal is in one of it's two possible states e.g. 0 then a signal that is present at the input of the switch is present at the output of the switch, too and the switch is ON. Otherwise, when the binary signal is in the other state e.g. 1 then the signal present at the input of the switch is not present at the output of the switch and the switch is OFF. For each horizontal line, one or more, or possibly all of the switches may be ON. For each vertical line, only one switch is ON. It is also further considered that each of the horizontal transmission lines is driven by a driver having an input and an output. The input of the driver adapts to an input impedance connection e.g. 50 ohm and it's output adapts to a characteristic impedance of the horizontal line. Because the horizontal transmission lines are coupled to the switching elements the input impedance of said switching elements influences the characteristic impedance of the transmission line, the characteristic impedance becoming an effective characteristic impedance. Therefore in order to maintain the integrity of an input signal independent with respect to effective characteristic impedance of the horizontal transmission line, said driver must be adapted to the effective characteristic impedance.

Such a solution is known from U.S. Pat. No. 6,175, 239B1. According to the known solution in a communication system comprising transmission lines coupled to the outputs of buffers it is provided an apparatus that determines the effective impedance of the transmission lines. The information provided by the apparatus is then used to control the output impedance of the buffers. The apparatus is further used in a computer network, the process of determining the effective characteristic impedance occurring any time a computer is started up. It should be mentioned here that the above mentioned apparatus is not applicable to a crosspoint matrix switching circuit because some of the switches coupled to the horizontally distributed transmission lines are ON and the other are OFF influencing the characteristic impedance of the horizontal transmission line. The tuning process e.g. adapting the output impedance of the buffer to the effective impedance of the transmission line should take place any time when at least one switch changes it's state. Because the tuning process is time consuming, in circuits working at GHz frequencies the method is not very well applicable. Furthermore, because the horizontal lines are coupled all the time only to the switches a simpler tuning method should apply.

It is therefore an object of the present invention to provide a transmission lines arrangement suitable to be used in a crosspoint matrix circuit. It is another object of the present invention to provide a transmission lines arrangement with a delay of any input signal significantly independent with respect to the path i.e. the way from an input to a selected output.

In accordance with the invention this is achieved in a device as described in the introductory paragraph characterized in that each of the switching elements of the plurality of switching elements have a relatively high input impedance in comparison with the effective characteristic impedance and a relatively high output impedance in comparison with the effective characteristic impedance, each transmission line of the first plurality of transmission lines being further coupled to an impedance that is substantially equal to the effective characteristic impedance of said transmission line.

Considering that the switching elements are positioned at a distance D from each other then each section of a transmission line is characterized by a capacity $C_d$. In order to minimize the influence of the input impedance of the switching elements their input capacitance should be much lower than $C_d$.

Furthermore, their input resistance must be much higher than the characteristic impedance of the transmission line such that in the worst case i.e. when all the switches coupled to a transmission line are ON the overall impedance of the transmission line to be substantially uninfluenced. When the transmission line arrangement is realized in a chip the characteristic impedance and the capacitance of a portion with the length D are known and an overall appreciation of the effective characteristic impedance could be made. Under these circumstances a resistance that equals the effective transmission line impedance is coupled at the end of the transmission line.

The output of the switching elements are coupled to the vertical transmission lines and at one moment only one of the switching elements is ON. Under these circumstances the output of the other switching elements must not influence the transmission of a signal through the transmission line i.e. none of the switching elements must be a receiver for the signal. As a matter of consequence the output impedance of the switching element must be much greater than the effective characteristic impedance of the transmission line.

In an embodiment of the invention the transmission line arrangement comprises as switching elements switcheable voltage to current (V–I) converters. The switcheable V–I converters have relatively high input impedance and relatively high output impedance fulfilling the conditions for the switching elements as they were previously presented. It should be mentioned here that the switcheable V–I converters have been chosen for illustrative purposes as an example of a switching element, skilled persons in the art being able to use other switching elements having high input impedance and high output impedance, such as transimpedance amplifiers.

In another embodiment of the invention the plurality of switching elements are differential. This feature reduces crosstalk to the substrate where the transmission lines are laid. Otherwise this influence is greater when single ended signals are used.

In another embodiment of the invention the first plurality of transmission lines is further coupled to a first plurality of input buffers for adapting to an input signal and the second plurality of transmission lines is further coupled to a second plurality of output buffers for transmitting the redirected signal. The buffers are useful in order to adapt the transmission lines to an external input connection e.g. 2×50 ohm the output impedance of the buffers being significantly equal to the characteristic impedance of the transmission lines.

In another embodiment of the invention the transmission line arrangement is characterized in that each of the transmission lines of the first plurality of transmission lines comprises portions of transmission lines and each of the transmission lines of the second plurality of transmission lines comprises portions of transmission lines. The transmission line arrangement further comprises a third plurality of delay elements coupling the first portions of transmission lines and a fourth plurality of delay elements coupling the second portions of the transmission lines. The total delay of a signal passing through any line of the first plurality of transmission lines and any line of the second plurality of transmission lines is independent with respect to which one of the first plurality of portions and which one of the second plurality of portions it passes through.

It should be observed that when very high frequency i.e. GHz range input signals pass through relatively long transmission lines the input signal deteriorates and the overall delay of the input signal through the arrangement depends on the signal path i.e. the transmission lines passing through. In order to obtain a significantly equal delay the transmission lines comprise portions of transmission lines coupled to delay elements such that the delay of an input signal through the arrangement is substantially independent with respect to the path through the arrangement.

Figure 2:
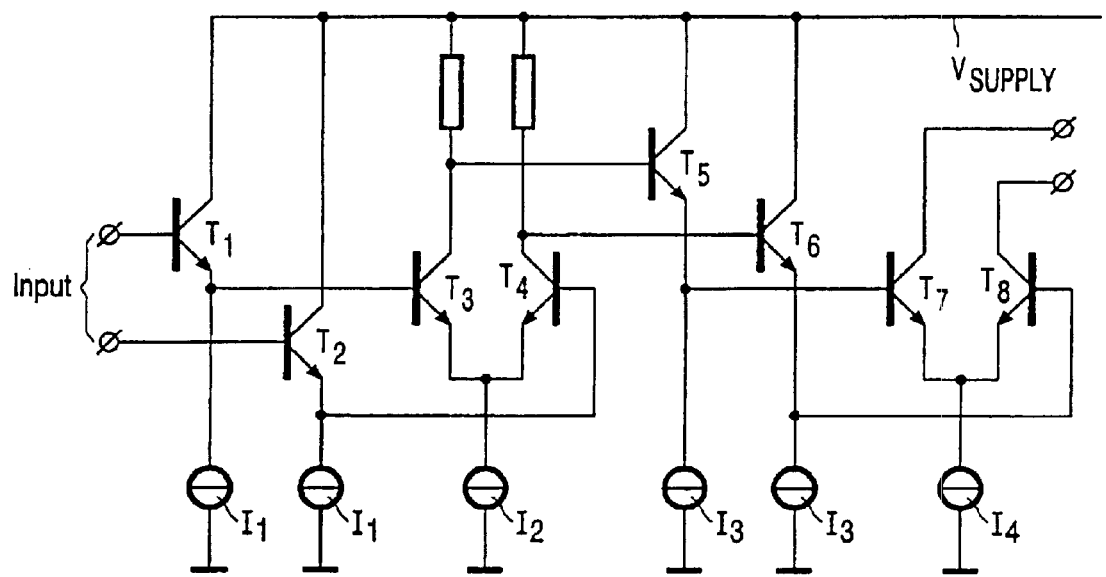
Figure 3:
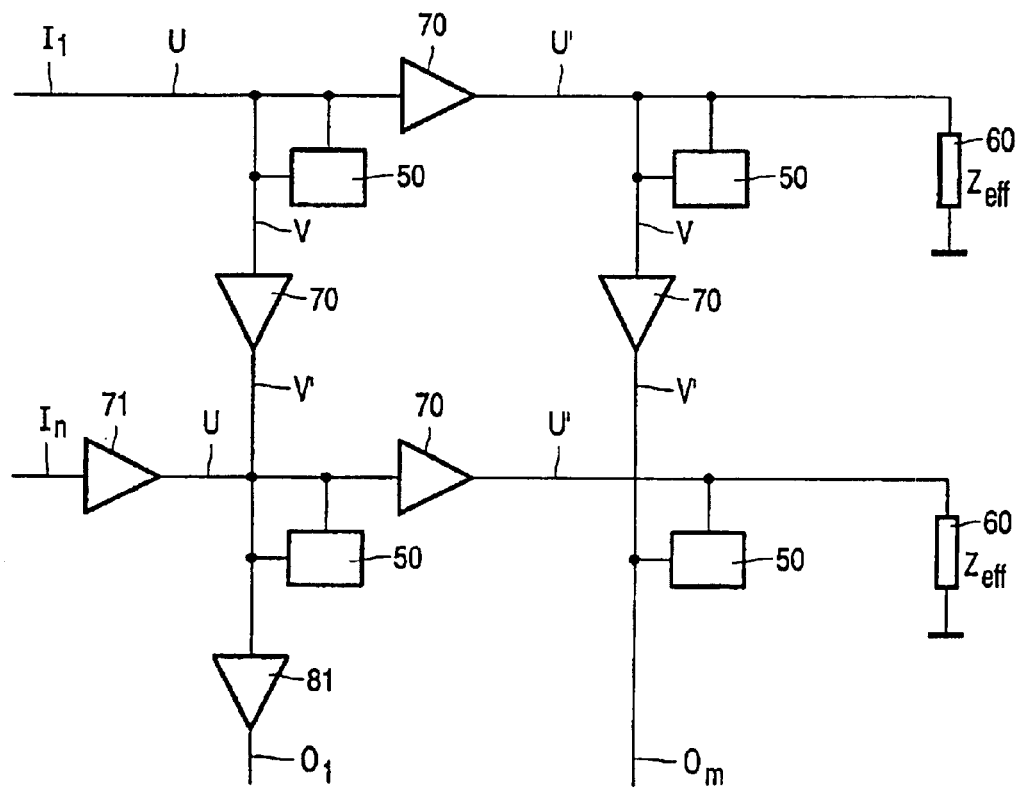

The above and other features and advantages of the invention will be apparent from the following description of exemplary embodiments of the invention with reference to the accompanying drawings, in which:

FIG. 1 depicts a block diagram of a transmission line arrangement according to the invention, FIG. 2 depicts a bipolar implementation of a voltage to current converter according to an embodiment of the invention, FIG. 3 depicts a transmission line arrangement using portions of transmission lines according to another embodiment of the invention.

FIG. 1 depicts a block diagram of a transmission line arrangement according to the invention. The arrangement 1 comprises a first plurality of transmission lines 30, identified as horizontal lines, and a second plurality of transmission lines 40 identified as vertical lines. The arrangement 1 further comprises input buffers 10 coupled to the horizontal lines 30 and output buffers 20 coupled to the vertical lines 40. The input buffers 10 have an input adapted to an external coupling e.g. 2×50 ohm and an output adapted to a characteristic impedance of the horizontal line. The output buffers 20 have an input and an output. An input signal received at the input is reshaped and their output is adapted to an external coupling e.g. 2×50 ohm. The arrangement further comprises a plurality of switcheable voltage to current (V–I) converters 50 each of said V–I 50 having an input coupled to a horizontal line 30 and an output coupled to a vertical line 40. Any of the V–I converters has two binary states i.e. an ON state when the V–I converter transmits at the output a signal that is presented at its input and an OFF state when the signal present at the input is not transmitted at the V–I output. It is considered that there are m V–I 50 converters coupled to any horizontal line 30 and n V–I converters 50 coupled to any vertical line 40. The V–I converters 50 having its input coupled to a same horizontal line is labeled horizontal set of converters. The V–I converters 50 having its output coupled to a same vertical line is labeled vertical set of converters. It is further assumed that there is a physical distance D between two consecutive horizontal converters 50 and another physical distance D' between two consecutive vertical converters. Preferable the buffers and the V–I converters 50 are differential and as a matter of consequence the horizontal and vertical lines are also differential. This feature improves a signal to noise ratio by reducing the crosstalk to the substrate where the transmission lines are arranged. When single ended signals are used this influence is greater.

At one moment only one vertical converter coupled to a vertical line is ON and, in the same time, at least one horizontal converter coupled to a horizontal line is ON. In so called broadcast coupling all the horizontal converters coupled to a horizontal line are ON. In the worst case when all m horizontal converters are coupled to a horizontal line i.e. in broadcast mode the total impedance that loads the horizontal line is $Z_i/m$, where $Z_i$ is the input impedance of any horizontal converter. In order to have a very small influence on a signal transmission through the horizontal line the input impedance of any horizontal converter should be $$Z_1 > 10 * m * Z_0 \quad (1)$$

In (1) $Z_0$ is the characteristic impedance of the horizontal line. Unfortunately there exist always a parasitic capacitance that can be calculated as in relation (2).

$$C_d = \frac{D\sqrt{\varepsilon_r}}{cZ_0} \quad (2)$$

In relation (2) $\varepsilon_r$ is the relative permittivity constant of the transmission line material and c is the speed of light. In order to minimize the effect of the input capacitance of the horizontal converters their input capacitance $C_i$ must be lower than the capacitance $C_d$. The overall effect of these capacitances if the input impedance fulfill condition (1) is a modification of the characteristic impedance of the horizontal line, which becomes an effective characteristic impedance like in relation (3).

$$Z_{0eff} = Z_0 \sqrt{\frac{C_d}{C_d + C_i}} \quad (3)$$

In order to maintain the integrity of any input signal each horizontal line must terminate on the effective characteristic impedance (60).

FIG. 2 depicts a bipolar implementation of a voltage to current converter according to an embodiment of the invention. The V–I converter has an input stage realized with transistors T1 and T2 connected as emitter followers, the transistors T1 and T2 being coupled to two input terminals Input. Said transistors T1 and T2 are supplied via a first current source I1 and they are further coupled to a differential pair of transistors T3 and T4 supplied via a second current source I2. The pair of transistors T3 and T4 is further coupled to transistors T5 and T6 connected as emitter followers and supplied via a third current source I3. The transistors T5 and T6 are further coupled to another differential pair T7 and T8 supplied via a fourth current source I4.

The transistors T7 and T8 form a differential current generator having high output impedance. The output current of the current generator has to be large enough in order provide sufficient signal swing at the input of the output buffer 20. When providing a large output current the input capacitance of the transistors T7 and T8 is large and in the same time the input impedance is relatively low. Under these circumstances the input of the differential current generator cannot be coupled to a horizontal line. Furthermore there are large differences between the values of the input capacitance and input impedance depending on the state of the V–I i.e. if V–I is ON or OFF. That is why the transistors T5 and T6 acting as emitter followers are provided. At the input of the V–I converter the transistors T1 and T2 are supplied with a current that is much lower than the supply current I4 of the further differential pair of transistors T7 and T8. As a matter of consequence the input capacitance is lowered and the input impedance is increased because the transistors T1 and T2 are emitter followers. A differential signal Input arriving at the input is transferred to the differential pair of transistors T3 and T4 via the transistors T1 and T2. The differential pair of transistors T3 and T4 amplify the input signal for compensating losses in the V–I converter. The amplified signal is transmitted to the further differential pair T7, T8 via the emitter followers T5, T6 having the role of buffers.

FIG. 3 depicts a transmission line arrangement using portions of transmission lines according to another embodiment of the invention. When the transmission line arrangement is used in high frequency applications i.e. GHz and the dimensions of the horizontal and vertical lines increase it is useful to limit the lengths of the said lines in order to better control their parameters as the effective characteristic impedance. The transmission arrangement 1 comprises the horizontal line having two portions U and U' coupled to each other via a buffer 70 said portion U' being terminated on the effective characteristic impedance 60 of the portion U'. The vertical lines comprises portions of transmission lines V and V' coupled each other via another buffer 80. It should be pointed out here that the buffers 70 and 80 could be as the circuit described in FIG. 2 with suitable input and output adaptations to the input impedance and the effective characteristic impedance of the lines respectively. Furthermore the buffers are coupled to the lines only when they are selected resulting in a low power consumption for the whole arrangement.

In order to equalize the time delay of an input signal passing from any input to any output of the arrangement 1, two additional buffers 71 and 81 are added. For example an input signal applied at the input I1 that is outputted at the output O1 is substantially equally delayed as the same signal that is outputted at the output Om. The delay difference between the two signals described above is called skew and in many situations it is preferable to be minimized. The additional buffers 71 and 81 are added for making the delay of any input signal through the arrangement to be substantially independent to the signal path.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

What is claimed is:

1. A transmission lines arrangement (1) comprising a first plurality of transmission lines (30) each transmission line having an effective characteristic impedance and comprising a second plurality of transmission lines (40), said first plurality of transmission lines (30) being coupled to a plurality of switching elements (50), the plurality of switching elements (50) being conceived to redirect an input signal from one transmission line of the first plurality of transmission lines (30) to at least one transmission line of the second plurality of transmission lines (40), characterized in that each of the switching elements of the plurality of switching elements (50) have a relatively high input impedance in comparison with the effective characteristic impedance and a relatively high output impedance in comparison with the effective characteristic impedance, each transmission line of the first plurality of transmission lines (30) is further coupled to an impedance (60) that is substantially equal to the effective characteristic impedance of said transmission line.

2. A transmission line arrangement as claimed in claim 1 wherein the first plurality of transmission lines (30) is further coupled to a first plurality of input buffers (10) for adapting to an input signal and the second plurality of transmission lines is further coupled to a second plurality of output buffers (20) for transmitting the redirected signal.

3. A transmission line arrangement (1) as claimed in claim 1 wherein each of the transmission lines of the first plurality of transmission lines (30) comprises portions of transmission lines (U, U'), each of the transmission lines of the second plurality of transmission lines (40) comprises portions of transmission lines (V, V'), the transmission line arrangement (1) further comprising a third plurality of delay elements (60) coupling the first portions of transmission lines (U, U') and fourth plurality of delay elements (70) coupling the second portions of the transmission lines (V, V') such that a total delay of a signal passing through any line of the first plurality of transmission lines (30) and any line of the second plurality of transmission lines (40) is independent with respect to which one of the first plurality of portions and which one of the second plurality of portions it passes through.

4. A transmission line arrangement (1) as claimed in claim 3 wherein the delay elements are further buffers.

5. A transmission lines arrangement (1) comprising a first plurality of transmission lines (30) each transmission line having an effective characteristic impedance and comprising a second plurality of transmission lines (40), said first plurality of transmission lines (30) being coupled to a plurality of switching elements (50) that are switcheable voltage to current converters, the plurality of switching elements (50) being conceived to redirect an input signal from one transmission line of the first plurality of transmission lines (30) to at least one transmission line of the second plurality of transmission lines (40), characterized in that each of the switching elements of the plurality of switching elements (50) have a relatively high input impedance in comparison with the effective characteristic impedance and a relatively high output impedance in comparison with the effective characteristic impedance, each transmission line of the first plurality of transmission lines (30) is further coupled to an impedance (60) that is substantially equal to the effective characteristic impedance of said transmission line.

6. A transmission lines arrangement (1) comprising a first plurality of transmission lines (30) each transmission line having an effective characteristic impedance and comprising a second plurality of transmission lines (40), said first plurality of transmission lines (30) being coupled to a plurality of differential switching elements (50), the plurality of differential switching elements (50) being conceived to redirect an input signal from one transmission line of the first plurality of transmission lines (30) to at least one transmission line of the second plurality of transmission lines (40), characterized in that each of the switching elements of the plurality of differential switching elements (50) have a relatively high input impedance in comparison with the effective characteristic impedance and a relatively high output impedance in comparison with the effective characteristic impedance, each transmission line of the first plurality of transmission lines (30) is further coupled to an impedance (60) that is substantially equal to the effective characteristic impedance of said transmission line.

\* \* \* \* \*